(12) United States Patent
He et al.

(10) Patent No.: US 7,443,506 B2
(45) Date of Patent: Oct. 28, 2008

(54) COMPACT SPECTRAL READERS FOR PRECISE COLOR DETERMINATION

(75) Inventors: Fan He, Gurnee, IL (US); Zhihao Lin, Princeton Junction, NJ (US); Yue Yao, Issaquah, WA (US)

(73) Assignee: Octadem Technologies, Inc., Princeton Junction, NJ (US)

( * ) Notice: Subject to any disclaimer, the term of this patent is extended or adjusted under 35 U.S.C. 154(b) by 38 days.

(21) Appl. No.: 10/579,597

(22) PCT Filed: Nov. 9, 2004

(86) PCT No.: PCT/US2004/037517

§ 371 (c)(1),
(2), (4) Date: May 17, 2006

(87) PCT Pub. No.: WO2005/050148

PCT Pub. Date: Jun. 2, 2005

(65) Prior Publication Data

US 2007/0146709 A1    Jun. 28, 2007

Related U.S. Application Data

(60) Provisional application No. 60/520,944, filed on Nov. 18, 2003.

(51) Int. Cl.
*G01J 3/50* (2006.01)
(52) U.S. Cl. ............... 356/402; 356/407; 356/420; 250/226
(58) Field of Classification Search ............... 356/402, 356/405, 406, 407, 420; 250/226
See application file for complete search history.

(56) References Cited

U.S. PATENT DOCUMENTS 5,963,333 A    10/1999    Walowit et al.

*Primary Examiner*—F. L. Evans

(57) ABSTRACT

Systems and methods for providing spectral measurements are described. In one embodiment, a spectral measuring device comprises at least one radiation source configured to provide N ($N \geq 2$) linearly independent illuxninant sources characterized by M ($M \geq N$) wavelength channels in a predetermined wavelength range; a sensor unit including at least one sensor, configured to be in optical communication with the radiation sources and an object; a memory storing an illuminant characterization matrix including spectral characteristics of the N illuminant sources in the M wavelength channels; and a processor configured to provide spectral responses of the object in the M wavelength channels, based at least in part on the illuminant characterization matrix. The embodiments of the invention can be used to construct a new class of compact spectral measuring devices, such as handheld color measuring devices.

20 Claims, 6 Drawing Sheets

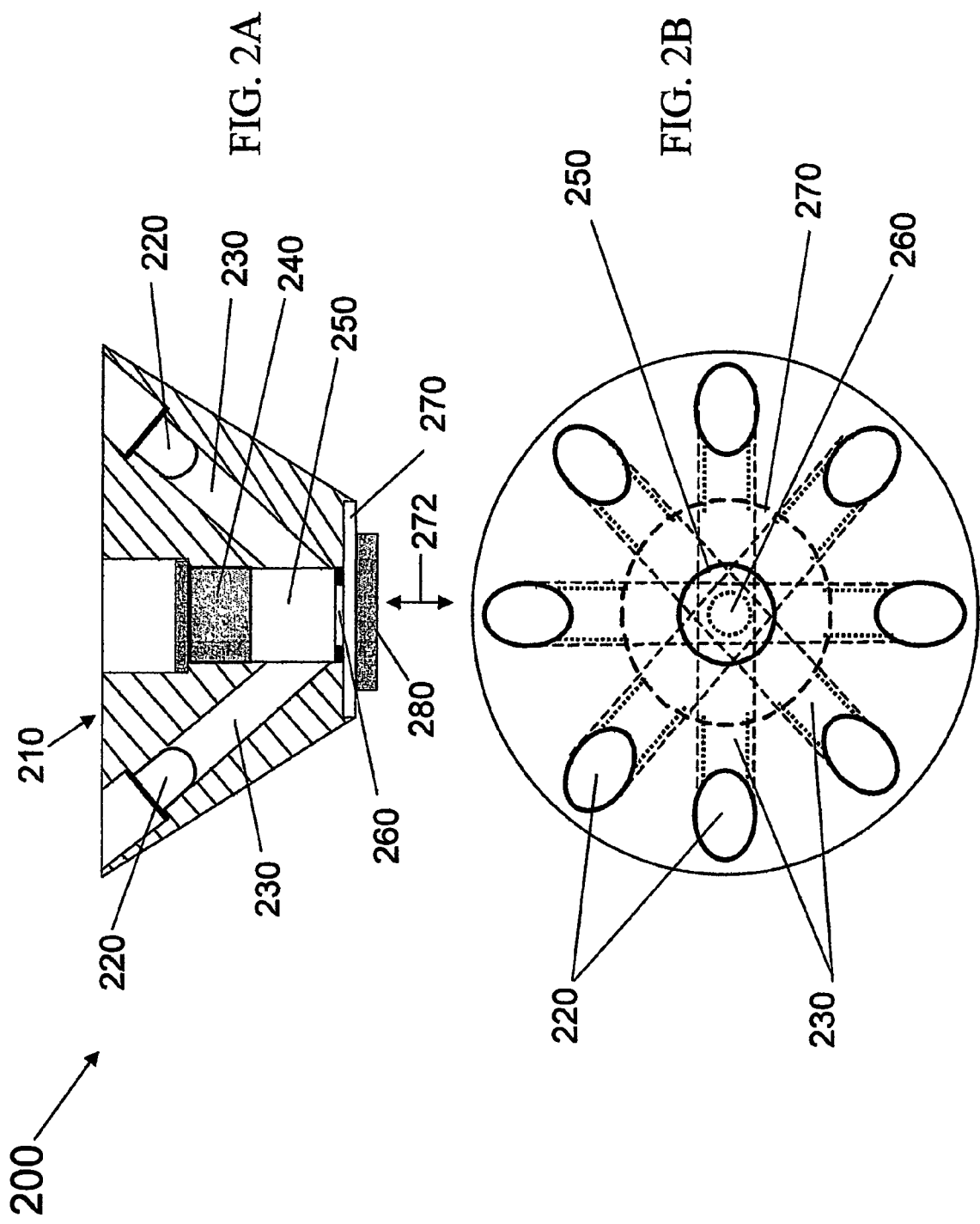

COMPACT SPECTRAL READERS FOR PRECISE COLOR DETERMINATION

CROSS REFERENCE TO RELATED APPLICATIONS

This application claims priority to U.S. Provisional Patent Application No. 60/520,944, filed on Nov. 18, 2003, the entirety of which is hereby incorporated by reference.

FIELD OF THE INVENTION

This invention generally relates to spectral measuring systems. More specifically, embodiments of the invention can be used to construct a new class of compact spectral measuring devices, such as handheld color measuring devices.

BACKGROUND

Spectral (or color) measurement is required in many industries or businesses that produce, use, or sell dyes, inks, paints, and other color products. Color measurement has also become increasingly involved in consumer products. For example, many test products used in laboratories or households for conducting chemical or biochemical analyses display the test results by way of color, as evaluated by eyes or by color measuring devices. In many applications, it is desirable to have spectral (or color) measuring devices that are compact in size (e.g., handheld), accurate in color determination, and economical in cost.

Conventional spectral measuring devices employ diffraction gratings and associated optical elements to detect the spectral responses (or colors) of a test object. As a result, such devices are characteristically expensive and bulky, rendering them unsuitable as consumer products. Although relatively inexpensive and lightweight devices for color measurement have become available in recent years, which make use of light emitting diodes (LEDs) for illumination and optical sensors for detection, these devices suffer a number of limitations, notably unsatisfactory accuracy in color determination.

In view of the forgoing, a need therefore exists in the art, for spectral measuring devices that overcome the aforementioned limitations.

SUMMARY

Embodiments of the invention relate to spectral measuring systems.

In one embodiment, a spectral measuring device comprises at least one radiation source configured to provide N (N≧2) linearly independent illuminant sources characterized by M (M≧2) wavelength channels in a predetermined wavelength range; a sensor unit including at least one sensor, configured to be in optical communication with the radiation sources and an object; a memory storing an illuminant characterization matrix including spectral characteristics of the N illuminant sources in the M wavelength channels; and a processor configured to provide spectral responses of the object in the M wavelength channels, based at least in part on the illuminant characterization matrix.

The above and other embodiments are mentioned not to limit or define the invention, but to provide examples of embodiments of the invention to aid understanding thereof. Embodiments are discussed in the Detailed Description, and further description of the invention is provided there. Advantages offered by the various embodiments of the invention may be further understood by examining this specification.

BRIEF DESCRIPTION OF THE FIGURES

These and other features, aspects, and advantages of the present invention are better understood when the following Detailed Description is read with reference to the accompanying drawings, wherein:

FIGS. 2A-2B show two perspective views of an optical assembly in reflectance configuration, according to an embodiment of the invention;

DETAILED DESCRIPTION

Embodiments and accompanying drawings depicted in the following are provided by way of example to illustrate some general principles of the invention, and should not be construed as limiting the scope of the invention in any manner. One skilled in the art would also recognize that various changes and modifications can be made herein, without departing from the principles and scope of the invention.

Figure 1A:
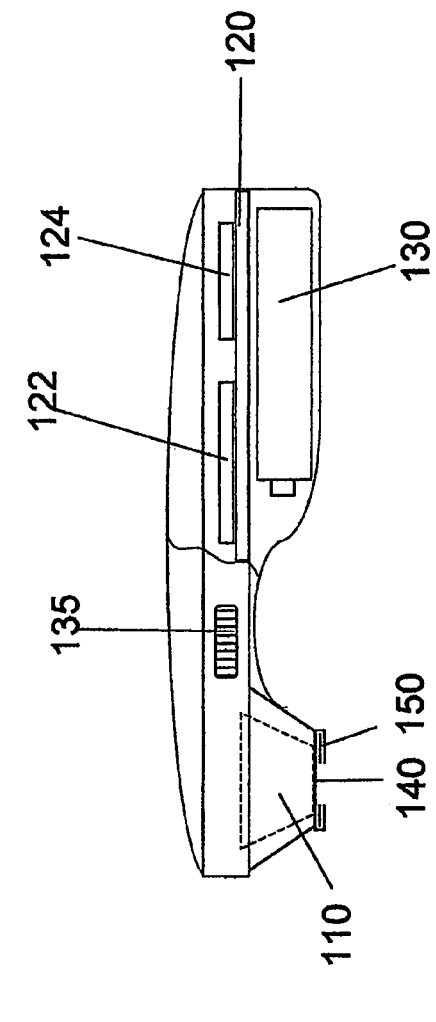
FIGS. 1A-1B depict two perspective views of a spectral reader, according to an embodiment of the invention.
Figure 1B:
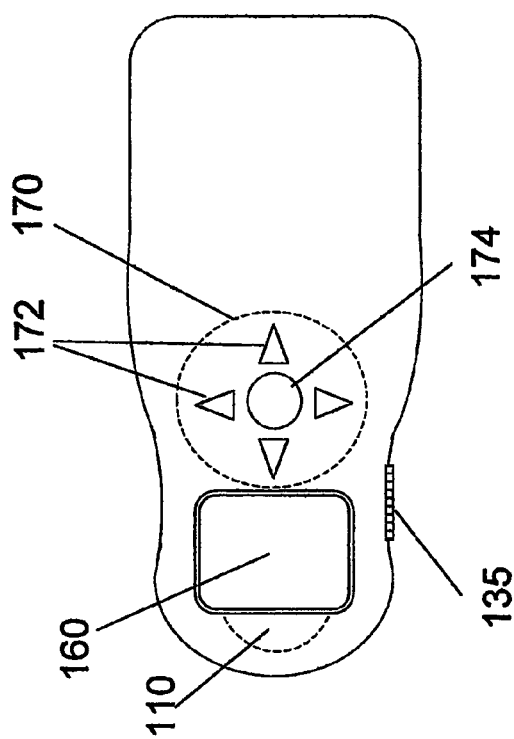

FIGS. 1A-1B depict two perspective views of a spectral measuring device (termed "spectral reader" herein) 100, according to an embodiment of the invention. The spectral reader 100 comprises, as shown in a side view of FIG. 1A: an optical assembly 110; a circuit board 120 which may include a processor 122 and a memory 124; a power source 130 (e.g., one or more batteries); a power switch 135; an aperture 140; and optionally, a sample holder 150, in close proximity to the aperture 140. The spectral reader 100 may further comprise, as shown in the top view of FIG. 1B: a display panel 160; and a plurality of user-interface elements 170, including one or more navigation keys 172 and an execution key 174.

In the embodiment of FIGS. 1A-1B, the aperture 140 is in optical communication with the optical assembly 110 (as further illustrated in the following). The sample holder 150 is configured to allow an object (or sample) to be placed such that the sample is in the requisite optical communication with the optical assembly 110 via the aperture 140. As a way of example, the sample holder 150 is shown to have an "open" structure in FIG. 1A. In other embodiments, the sample holder 150 can also form a "closed" structure, e.g., configured to provide a dark enclosure to the sample contained therein. Further, the configuration may be such that the sample holder 150 is removable, or interchangeable. In some situations, the measurement may also be made without the aid of a sample holder, e.g., by placing the sample in direct contact with the aperture 140.

FIGS. 2A-2B show a side view and a top view of an optical assembly 200 in reflectance configuration, according to an embodiment of the invention. The optical assembly 200 may be used as an embodiment of the optical assembly 110 of FIG. 1A, for instance. The optical assembly 200 comprises: an illumination source which may include a plurality of LEDs 220; a plurality of LED tunnels 230, e.g., each associated with one or more of the LEDs 220; a sensor unit 240 which may include one or more optical sensors; a sensor tunnel 250; an aperture 260 (which may provide for the aperture 140 of FIG. 1A); and a sample port 270. As an example to illustrate how various components are configured, a sample 280 is also shown. In one embodiment, the optical assembly 200 may be built on a mold component 210 that hosts its constituent elements, as shown in FIG. 2A. The mold component 210 may be for example made by way of casting, e.g., on a piece of plastics, or other suitable materials that have sufficiently low thermal expansion coefficients. In other embodiments, the LED tunnels 230 and/or the sensor tunnel 250 may be for example provided by one or more cylindrical structures (such as tubes), made of suitable materials (e.g., aluminum, chromium, plastic, etc.).

In one embodiment, the LED tunnels 230 may each be at a 45-degree angle relative to a normal direction 272 of the sample port 270. The LEDs 220 may each be disposed in one of the LED tunnels 230 and aimed at the sample 280. The sample 280 is disposed in close contact with the sample port 270, such that very little ambient light can get into the aperture 260. The LED tunnels 230 may have reflective inner-surfaces, so as to enhance the diffuse reflectivity inside the tunnels. In one embodiment, for example, the inner surfaces of the LED tunnels may be activated chemically to allow for deposition of a layer of metal (e.g., chromium). The deposition can be achieved using electrochemical processes (e.g., electroplating). As such, radiation emitted from the LEDs 220 is confined in the respective LED tunnels 230 and projected onto the sample 280. Some fraction of the LED radiation may reach the sample 280 after one or more surface reflections inside the LED tunnels 230. Such reflections help improve illumination efficiency of the LEDs and provide a uniform illumination on the sample.

The sensor tunnel 250 is configured to be in alignment with the aperture 260. The sensor unit 240 may be disposed inside the sensor tunnel 250 and in direct optical communication with the sample 280 via the aperture 260. The surface of the sensor tunnel 250 and the surrounding of the aperture 260 may be treated such to minimize light reflection (e.g., by applying an anti-reflection coating).

The LEDs 220 may include a plurality of LEDs that have different types, and/or spectral characteristics. In some embodiments, different LEDs may be effectively obtained by altering spectral characteristics of one or more LEDs via suitable means, such as by applying one or more optical filters, and/or by changing the operating current. In this manner, a plurality of LEDs can be effectively constructed from, at least, one LED. The LEDs 220 may be selected such that the combined radiation spectrum of the LEDs 220 covers a particular wavelength range of interest, as further described below. In one embodiment, the LEDs 220, along with the sensor unit 240, may be in communication with and controlled by the circuit board 120 of FIG. 1A.

In a measurement process, the sample 280 is illuminated by the LEDs 220. The light reflected from the sample 280 is detected by the sensor unit 240. The sensor unit 240 converts the detected optical signals into corresponding electrical signals, which in one example may be associated with the intensity of the reflected light from the sample 280 under the illumination of LEDs 220. The sensor unit 240 outputs the electrical signals to the circuit board 120 of FIG. 1A, for example. The measured results may be presented by one or more numerical readings and/or graphic displays, e.g., shown on the display panel 160 of FIG. 1B.

Figure 3:
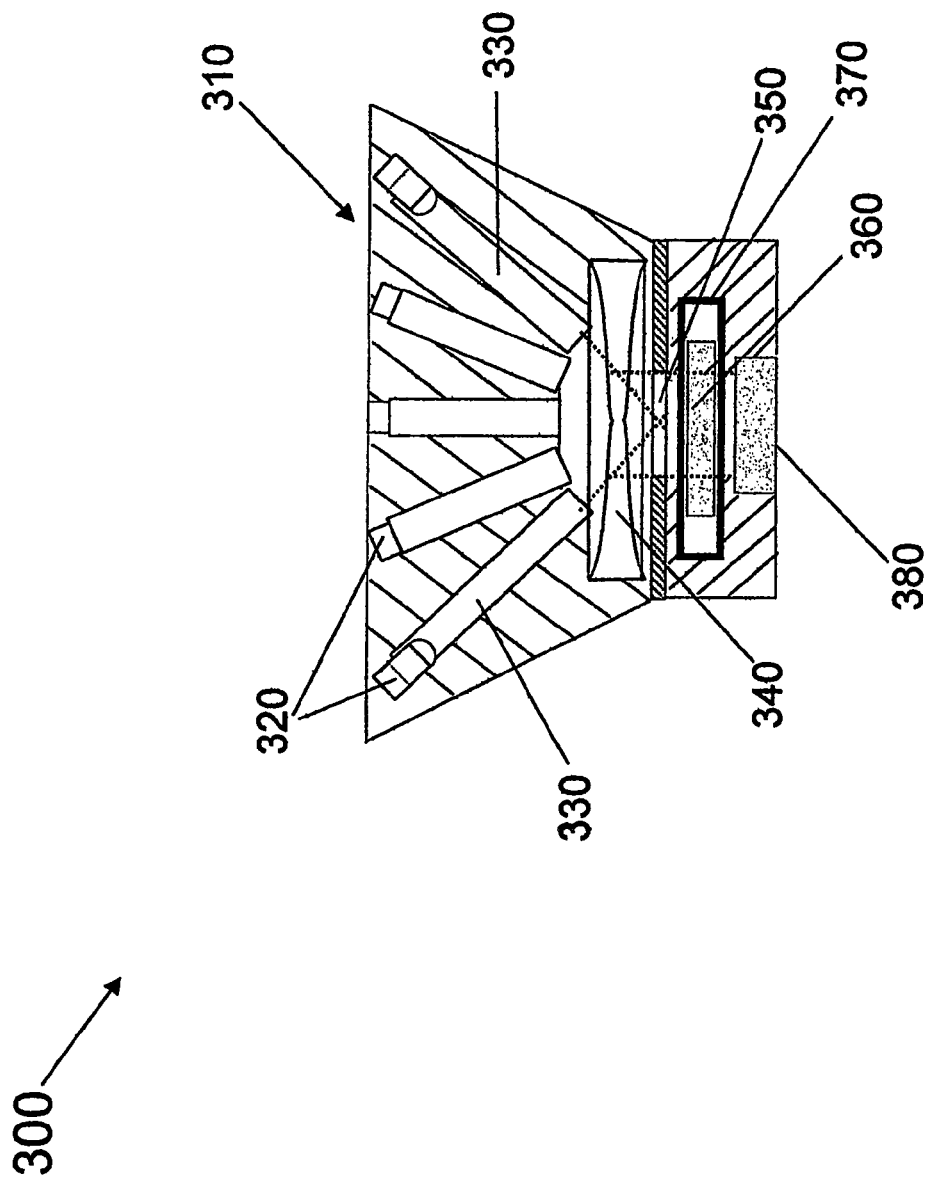
FIG. 3 shows a perspective view of an optical assembly in transmission configuration, according to an embodiment of the invention.

FIG. 3 depicts a perspective side view of an optical assembly 300 in transmission configuration, according to an embodiment of the invention. The optical assembly 300 may be alternatively used to embody the optical assembly 110 of FIGS. 1A-1B, for instance. The optical assembly 300 may likewise be built on a mold component 310. In this case, a plurality of LEDs 320 may be disposed in the respective LED tunnels 330, e.g., in a manner similar to what is shown in FIGS. 2A-2B. Light radiated from the LEDs 320 may be collimated by a lens 340, subsequently pass through an aperture 350, and then be incident on a sample 360 in a sample port 370. A sensor unit 380 including one or more optical sensors is disposed on the transmission side of the sample port 370, to detect the transmitted light from the sample 360. The LEDs 320, along with the sensor unit 380, may be in communication with and controlled by the circuit board 120 of FIGS. 1A, in one embodiment.

As a way of example to illustrate some general principles of the invention, the following description is presented with respect to a spectral reader operating in reflectance configuration (e.g., having an optical assembly as shown in FIGS. 2A-2B). It will be appreciated that the principles of the invention and the results thus obtained can also be applied to other spectral readers operating in transmission configuration (e.g., having an optical assembly as shown in FIG. 3).

The radiation intensity of an LED can be presented as a spectral curve peaked at a characteristic center wavelength. When a sample is illuminated by a single LED, the output of a sensor that collects the reflected (or transmitted) light from the sample includes three major components: 1) the spectral characteristics of the sample; 2) the spectral radiation curve of the LED; and 3) the spectral response function of the sensor.

When a sample is illuminated by a plurality of LEDs, a complete sample measurement may constitute a sequence of measurements performed under a plurality of linearly independent illuminant sources constructed from the LEDs. In one embodiment, for example, N (e.g., $N \geq 2$) linearly independent illuminant sources are constructed from various combinations of N LEDs (which can make use of those available commercially). Thus, the sample is effectively illuminated by N linearly independent illuminant sources thus created, and N measurements can be collected in a complete sample measurement. Dividing the wavelength range of interest into N wavelength channels (e.g., each wavelength channel corresponding with a particular color), the sample's reflectance (or transmittance) values in the N wavelength channels can be determined from the N measurements, as further described below.

In one embodiment, a spectral reader of the invention may be characterized (e.g., at the factory) by use of a "characterization sample," whereby the spectral radiation curves of N illuminant sources can be obtained. The characterization process may be carried out, for example, by using a standard white sample (or an integrating sphere, e.g., a hollow sphere with an inner surface having a sufficiently high diffusive reflectivity) as the characterization sample, an external spectral analyzer (such as a spectrometer) with adequate spectral resolution, and an external computing device (e.g., a computer).

Figure 4:
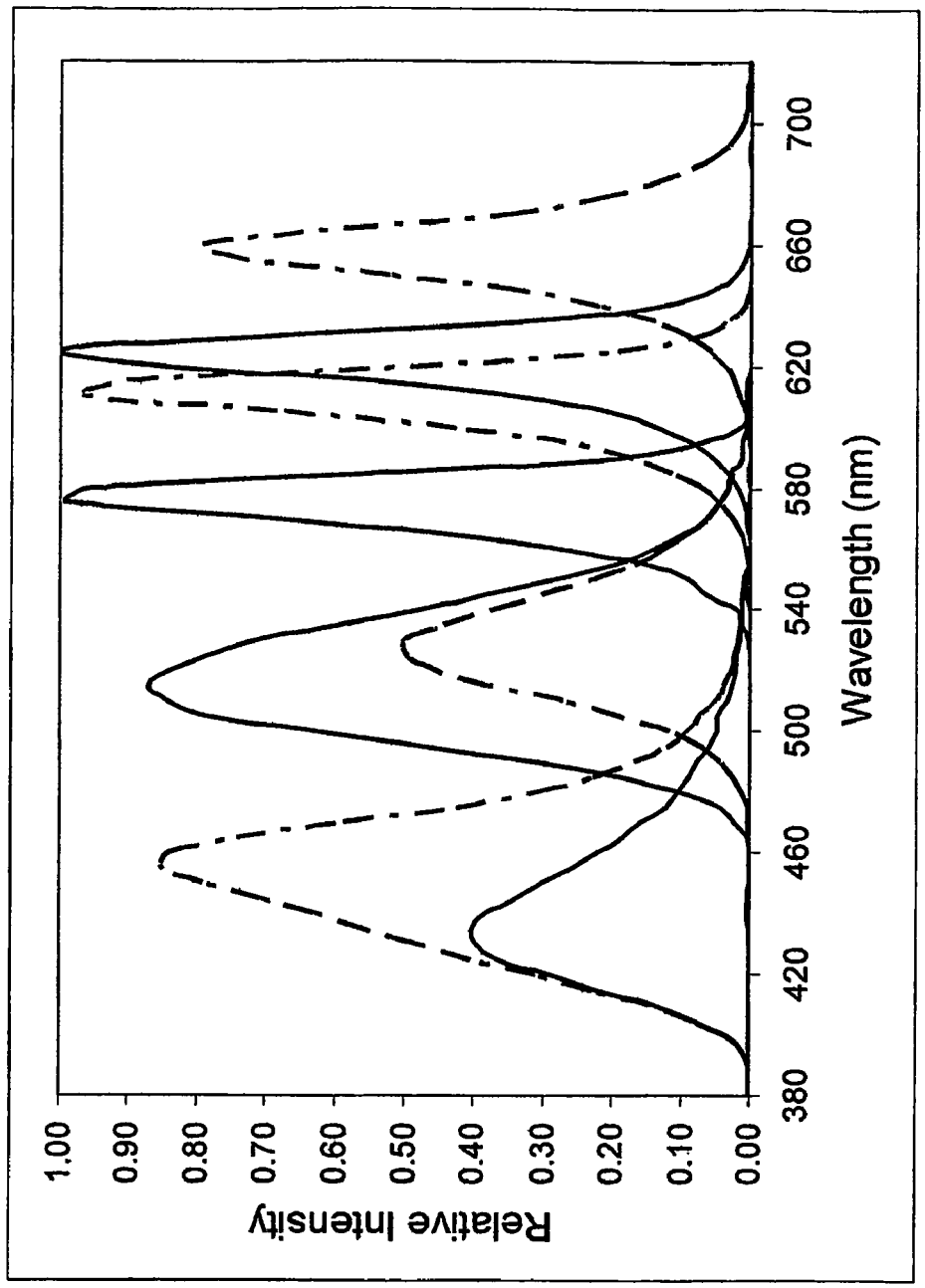
FIG. 4 depicts spectral radiation curves measured from eight illuminant sources configured from eight LEDs, according to an embodiment of the invention.

In one embodiment of a characterization process, the standard white sample is illuminated in turn by N linearly independent illuminant sources constructed from N LEDs used in a spectral reader of interest. The light reflected from the surface of the standard white sample is measured by the external spectral analyzer, and the spectral radiation curve of each illuminant source is recorded. By way of example, FIG. 4 shows spectral radiation curves measured from a system of eight independent illuminant sources, covering a wavelength range approximately from 400 nm to 700 nm. In this case, eight linearly independent illuminant sources are constructed from eight LEDs (e.g., by using various combinations of one or more LEDs selected therefrom). For purposes of illustration and clarity, the spectral radiation curves are shown by alternate solid and dashed lines in FIG. 4.

The measured spectral radiation curves of the independent illuminant sources can be used to construct an "Illuminant Characterization Matrix" (or "Source Characterization Matrix") which can be stored in the spectral reader (e.g., in the memory 124 of FIG. 1A). The following provides an embodiment of how an Illuminant Characterization Matrix can be computed.

Suppose that N LEDs are used in a spectral reader. Divide the wavelength range covered these LEDs into N wavelength channels, each occupying a wavelength range from $\lambda_{j-1}$ to $\lambda_j$ ($\lambda_j > \lambda_{j-1}$, j=1, 2, $\Lambda$, N). The wavelength channels may have unequal widths.

The average intensity of the ith illuminant source in the jth wavelength channel can be expressed as $$I_{ij} = \frac{1}{\lambda_j - \lambda_{j-1}} \cdot \int_{\lambda_{j-1}}^{\lambda_j} I_i(\lambda) d\lambda; \quad \text{Eq. (1)}$$
$$i = 1, 2, \Lambda, N; j = 1, 2, \Lambda, N.$$

where $I_i(\lambda)$ is the spectral radiation curve of the ith illumination source measured by the external spectral analyzer.

When the above calculation is performed with respect to N wavelength channels and N illuminant sources, an N×N matrix, $\overset{\tau}{I}$, is thus constructed. The inversion of this matrix, termed "Illuminant Characterization Matrix" (or "Source Characterization Matrix") herein, can be shown as $$\overset{\tau}{J} = \overset{\tau}{I}^{-1} = [I_{ij}]^{-1}. \quad \text{Eq. (2)}$$

The above calculations can be performed by the external computing device. The Illuminant Characterization Matrix $\overset{\tau}{J}$ thus obtained is then stored in the spectral reader.

To obtain the reflectance (or transmittance) values of a sample in the N wavelength channels of interest, the spectral reader needs to be calibrated, e.g., by use of one or more "calibration samples." In one embodiment, a substantially white (or "light") sample and a substantially black (or "dark") sample may serve as the calibration samples. In alternative embodiments, a single white (or "light") sample may also be used for the calibration purpose. The calibration process may be performed at the factory, and the calibration data thus obtained are stored in the spectral reader. The calibration process may also be performed by the user, e.g., before making a measurement or whenever it is deemed useful.

Consider a calibration process involving white and black calibration samples. The spectral reader performs a sequence of measurements on each calibration sample. The measured data, which may include for example N "black calibration readings" and N "white calibration readings," can be represented by $$\overset{\omega}{V_B} = \begin{pmatrix} V_{B1} \\ V_{B2} \\ M \\ V_{BN} \end{pmatrix} \text{ and } \overset{\omega}{V_W} = \begin{pmatrix} V_{W1} \\ V_{W2} \\ M \\ V_{WN} \end{pmatrix}, \quad \text{Eq. (3)}$$

where the subscripts "B" and "W" stand for the black sample and the white sample, respectively. The calibration data of Eq. (3), in conjunction with the Illuminant Characterization Matrix of Eq. (2), are used to determine the reflectance values of a sample in the respective wavelength channels of interest, as further described below.

In a subsequent sample measurement (e.g., performed by a user), the reading of the sensor unit under the ith illumination source can be expressed as $$V_i = A \cdot \sum_{j=1}^{N} I_{ij} \cdot R_j \cdot G_j + V_{Bi}; i = 1, 2, \Lambda, N, \quad \text{Eq. (4)}$$

where A represents an instrument-related constant, $R_j$ represents the average reflectance (or transmittance) of the sample in the jth wavelength channel, $G_j$ is the average sensitivity of the sensor unit in the jth wavelength channel, $V_{Bi}$ is the black calibration reading under the ith illuminant source (which may also include contributions from ambient environment), and $I_{ij}$ is the average intensity of the ith illumination source in the jth wavelength channel.

Eq. (4) can be represented by a N×N linear system:

$$\overset{\omega}{V} = \overset{\omega}{F} \cdot \overset{\omega}{I} + \overset{\omega}{V_B}, \quad \text{Eq. (5)}$$

where $$\overset{\omega}{V} = \begin{pmatrix} V_1 \\ V_2 \\ M \\ V_N \end{pmatrix}, \overset{\omega}{F} = \begin{pmatrix} AG_1R_1 \\ AG_2R_2 \\ M \\ AG_NR_N \end{pmatrix}, \quad \text{Eq. (6)}$$

$$\text{and } \overset{\tau}{I} = \begin{pmatrix} I_{11} & I_{12} & \Lambda & I_{1N} \\ I_{21} & I_{22} & \Lambda & I_{2N} \\ M & M & O & M \\ I_{N1} & I_{N2} & \Lambda & I_{NN} \end{pmatrix}.$$

Eq. (5) can be further expressed as $$\overset{\omega}{F} = \overset{\tau}{I}^{-1} \cdot \left(\overset{\omega}{V} - \overset{\omega}{V_B}\right) = \overset{\tau}{J} \cdot \left(\overset{\omega}{V} - \overset{\omega}{V_B}\right) \quad \text{Eq. (7)}$$

where $\overset{\tau}{J}$ is the Illuminant Characterization Matrix in Eq. (2):

$$\overset{\tau}{J} = \overset{\tau}{I}^{-1} = \begin{pmatrix} J_{11} & J_{12} & \Lambda & J_{1N} \\ J_{21} & J_{22} & \Lambda & J_{2N} \\ M & M & O & M \\ J_{N1} & J_{N2} & \Lambda & J_{NN} \end{pmatrix}. \quad \text{Eq. (8)}$$

Eq. (7) can be written as $$AG_iR_i = \sum_{j=1}^{N} J_{ij} \cdot (V_j - V_{Bj}); i = 1, 2, \Lambda, N. \quad \text{Eq. (9)}$$

As is in general practice, the reflectance value of a sample may be normalized in reference to the reflectance value of the white calibration sample. For the sake of simplicity, the reflectance value of the white calibration sample is defined as unity (or "1") in each wavelength channel of interest. Thus, when the measured sample is the white sample, Eq.(9) becomes $$AG_i = \sum_{j=1}^{N} J_{ij} \cdot (V_{Wj} - V_{Bj}); i = 1, 2, \Lambda, N,$$  Eq. (10)

where $V_{Wj}$ is shown in Eq.(3) above.

Combining Eqs. (9) and (10) above, the reflectance values of the sample in each wavelength channel can be shown as $$R_i = \frac{\sum_{j=1}^{N} J_{ij} \cdot (V_j - V_{Bj})}{\sum_{j=1}^{N} J_{ij} \cdot (V_{Wj} - V_{Bj})}, i = 1, 2, \Lambda, N.$$  Eq. (11)

The description above is presented with respect to an embodiment in which N linearly independent illuminant sources and N wavelength channels are constructed. In alternative embodiments, N illuminant sources and M (M≧2) wavelength channels can also be used. In such case, the Illuminant Characterization Matrix in Eq.(2) or Eq.(8) may be calculated, e.g., using the standard Least-square Method for M<N cases and the Singular Value Decomposition (SVD) method for M>N cases, and will have a dimension of M×N. Accordingly, the reflectance in Eq. (11) will have M components. Those skilled in the art will recognize, however, that these methods of computation are substantially equivalent.

Figure 5:
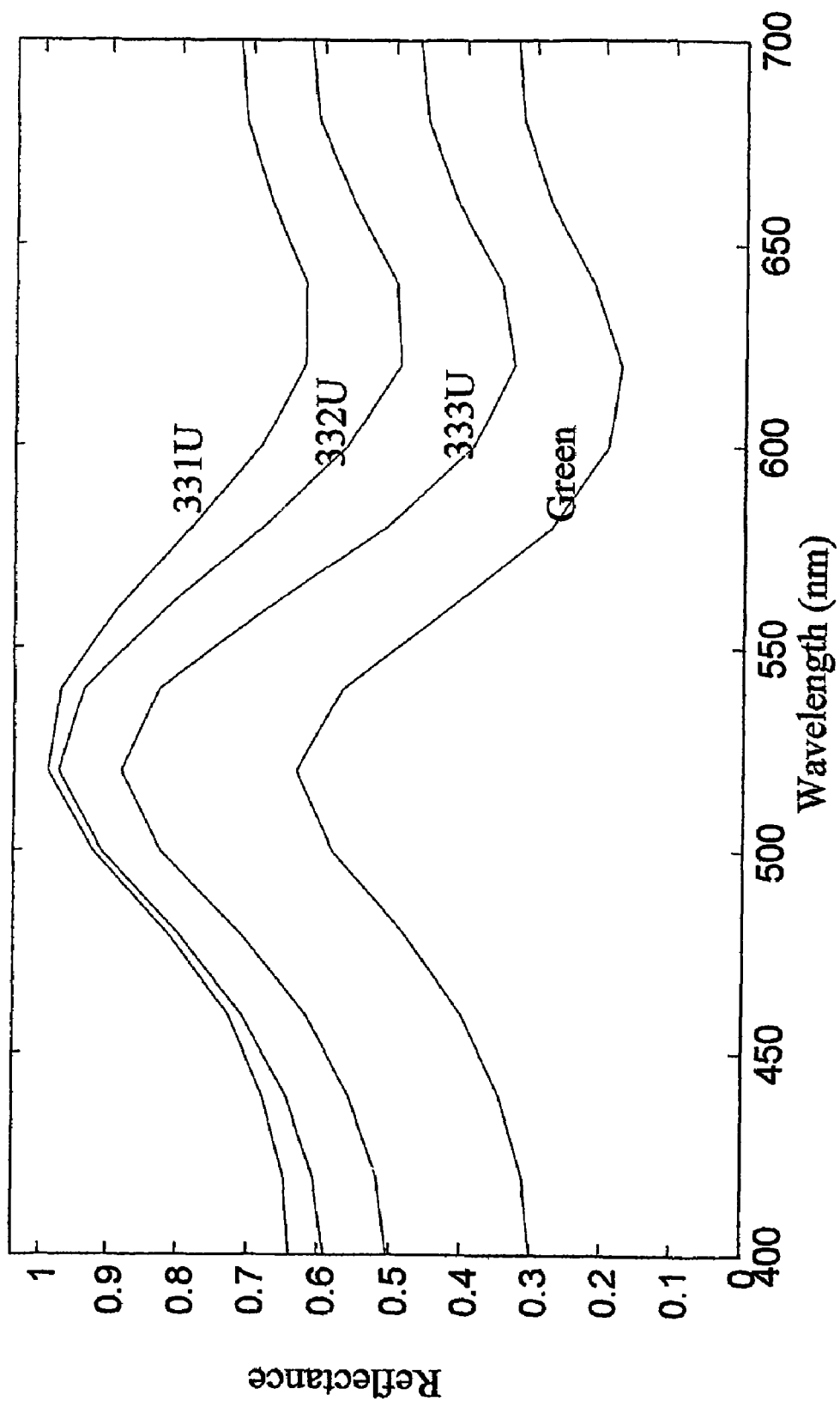
FIG. 5 shows spectral reflectance curves of several color samples measured by a spectral reader of the invention.

By way of example, FIG. 5 shows spectral reflectance curves of four test samples measured by a spectral reader of the invention that makes use of the eight illuminant sources (i.e., N=8) shown in FIG. 4 and sixteen wavelength channels (i.e. M=16). The four test samples are selected from PANTON color patches known in the art: 331U, 332U, 333U and PANTON Green. A skilled artisan will appreciate the quality of the spectral reflectance curves presented in FIG. 5.

Figure 6:
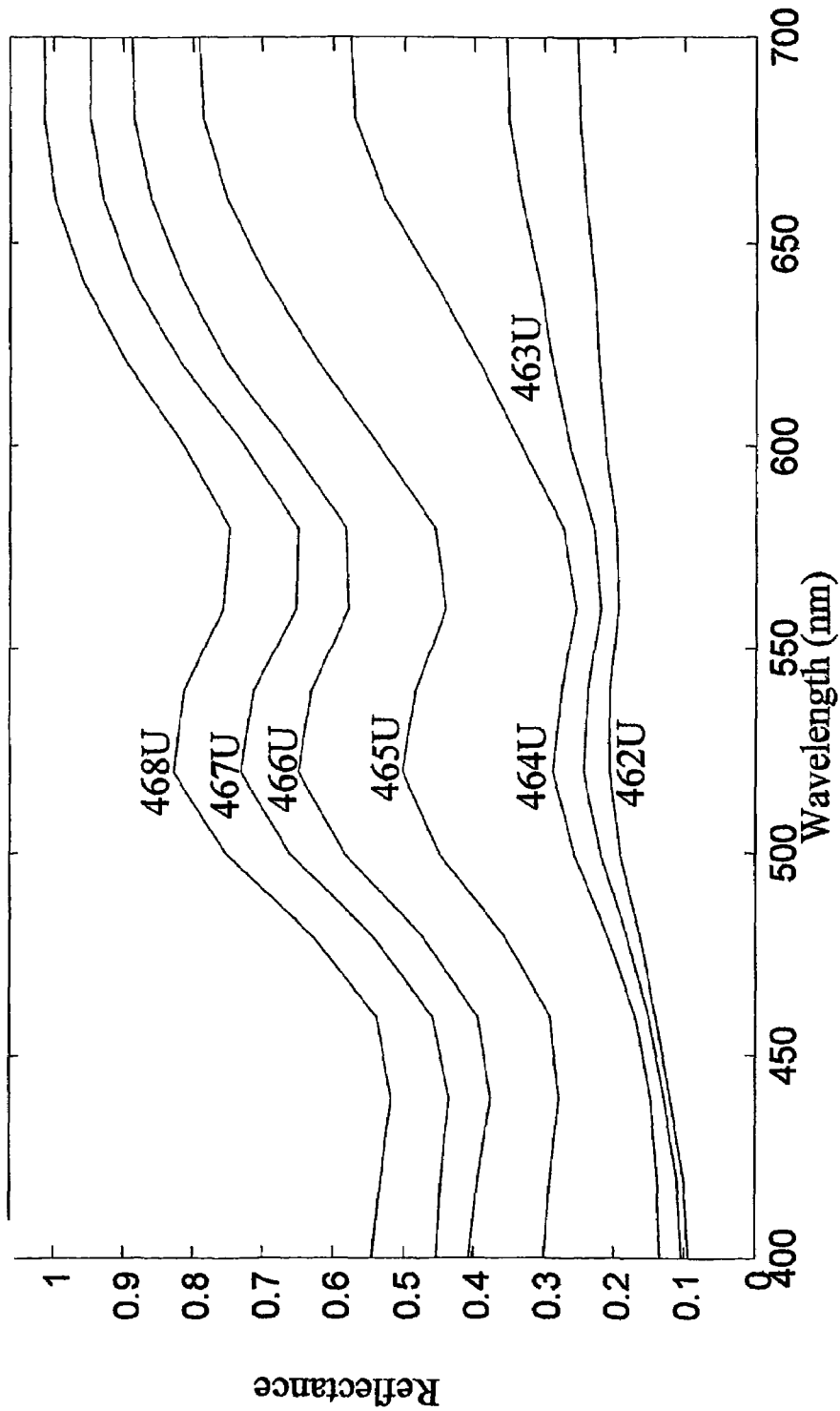
FIG. 6 depicts separations in spectral curves of several color samples measured by a spectral reader of the invention.

A spectral reader of the invention can further distinguish colors by their spectral characteristics. By way of example, FIG. 6 shows spectral reflectance curves measured from seven PANTON brown color patches known in the art: 462U, 463U, 464U, 465U, 466U, 467U and 468U. It is known that the differences between some of these colors are so small to be distinguished visually. However, these colors are clearly separated from one other in their reflectance curves measured by a spectral reader of the invention.

The description and analysis above are presented with respect to a spectral reader operating in reflectance configuration. When a spectral reader is operating in transmission configuration, it needs to be calibrated using a transparent sample. In terms of the equations derived above for the reflectance case, the components of $\vec{V}_s$ and $\vec{V}_w$ in Eq.(3) should be replaced with zeros and the readings obtained from a transparent calibration sample, respectively. Substituting these new values for $\vec{V}_s$ and $\vec{V}_w$ in Eq.(11), $R_i$, i=1, 2, Λ,N, become the spectral transmittance values of the sample in the N wavelength channels.

In one embodiment, a spectral reader of the invention may be preloaded (e.g., at the factory, or by the user) with various standard data tables (e.g., in the memory 124 of FIG. 1A), such as CIE 1964 Standard Colorimetrc Observer table and D65 Illuminant table known in the art. In this way, the spectral reader can also provide tristimulus values, or any standard color coordinates (e.g., CIELab), from the measured spectral curves.

In one embodiment, a spectral reader may be configured to measure, determine, and record the color coordinates of one sample serving as a "target." When a new measurement is made on another sample, the spectral reader can provide the color differences, such as the CIELab or CMC color differences, based on the newly calculated color coordinates and those of the target.

In one embodiment, a spectral reader may be configured to perform and record measurements on one or more "reference" samples, and a numerical value (or other non-numerical representation) for example is associated with each measurement according to a pre-determined scheme (e.g., by constructing an appropriate model). When measuring a new (or unknown) sample, the spectral reader can then evaluate the new measurement based on the stored reference data, e.g., by deriving a corresponding numerical value or non-numerical presentation for the unknown sample based on the model.

In one embodiment, a spectral reader may also include an internal clock (or "timer"), for example, to provide the time and date when a measurement is taken. A spectral reader of the invention may present and store its measurements in the form of spectral reflectance (or transmittance) values, spectral tristimulus values, standard color coordinates, standard color differences, numerical test values, or other non-numerical test representation. It may further allow the user to choose a particular form for presenting the measurement result, or view the measurement result in different forms, including (but not limited to) a time sequence form.

Referring back to FIGS. 1A-1B. The processor 122 can include, for example, a digital logical processor, a microprocessor, an Application Specific Integrated Circuit (ASIC), or any other means capable of processing input data, executing algorithms, and generating output data in a desired form. The memory 124 may be the embedded (or "on-chip") memory in the processor 122, storing (e.g., in firmware) the Illuminant characterization matrix of Eq. (8), the calibration data of Eq.(3), and instructions/algorithms for carrying out various measurements and computations. The memory 124 may also be "external" to the processor 122, providing additional memory (e.g., for storing the preloaded data and other relevant information). The circuit board 120 may be further equipped with data transfer capabilities, so as to allow the user to download or upload information, save the measurement result on other devices, such as user's home computer, and/or perform additional analysis on the collected data. The sensor unit 240 may include one or more sensors with different spectral response functions. The sensor unit 240 may also be provided by a Charge-Coupled Device (CCD) array.

Those skilled in the art will appreciate that by making use of LEDs and constructing a Illuminant characterization matrix as described above, a spectral reader of the invention affords accurate color determination and compact structure, hence applicable in a variety of consumer and industrial applications. For example, spectral readers of the invention can be configured as handheld testers for performing a variety of biomedical tests in laboratories or consumer's households. Such applications include (but are not limited to) quantitative analysis of nucleic acids, proteins and antibodies; routine health diagnostic and monitoring analysis such as urine tests and other bodily fluid analysis; food additive and contaminant analysis; forensic analysis; and so on. Spectral readers of the invention can also be configured as handheld color measuring devices that can for example provide quantitative and convenient measurements of paint, ink, dyes, cosmetics, and other color related products, as well as improve upon the existing color related products (such as pH papers and SND sticks).

In the above, examples are given in the visible wavelength range. Such should not be construed as limiting the scope of the invention in any manner, however. The principles of the invention can also be used to construct spectral readers operating in other wavelength ranges, such as the infrared and ultraviolet wavelength ranges. In one embodiment, a plurality of radiation sources (such as LEDs) may have overlapping spectra, and the wavelength channels thus formed may be continuous in a particular wavelength range. In other embodiments, the radiation sources (such as LEDs) may have discrete spectra, and the wavelength channels thus formed may also be discrete in a particular wavelength range. The principles and results of the invention (e.g., Eqs. (1)-(11) above), however, are applicable to such cases.

The foregoing description of the embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

What is claimed is:

1. An apparatus, comprising:
   at least one radiation source configured to provide N (N≧2) independent illuminant sources characterized by M (M≧2) wavelength channels in a predetermined wavelength range;
   a sensor unit including at least one optical sensor, the sensor unit configured to be in optical communication with the at least one radiation source and a sample;
   a memory storing an illuminant characterization matrix having spectral characteristics of the N illuminant sources in the M wavelength channels; and
   a processor in communication with the sensor unit and the memory, the processor configured to provide spectral responses of the sample in the M wavelength channels based at least in part on the illuminant characterization matrix.

2. The apparatus of claim 1 wherein the memory further comprises calibration data associated with a substantially white sample in the predetermined wavelength range, the processor configured to provide spectral reponses of the sample in the M wavelength channels based at least in part on the illuminant characterization matrix and the calibration data.

3. The apparatus of claim 1 wherein the spectral responses of the sample include reflectance values of the sample in the M wavelength channels.

4. The apparatus of claim 1 wherein the spectral responses of the sanole include transmittance value of the sample in the M wavelength channels.

5. The apparatus of claim 1 wherein M equals to N.

6. The apparatus of claim 1 wherein the memory further comprises program code for performing a calibration associated with at least one calibration sample in the predetermined wavelength range.

7. The apparatus of claim 1 wherein the at least one radiation source include at least one light emitting diode (LED).

8. The apparatus of claim 1 wherein the sensor unit includes at least one image sensor array.

9. The apparatus of claim 1 wherein the processor is further configured to cause a presentation associated with the spectral responses of the sample to be displayed on a display panel.

10. The apparatus of claim 1 further comprising at least one user-interface element.

11. The apparatus of claim 1 further comprising a data transfer means in communication with the processor.

12. The apparatus of claim 1 further comprising:
    the sample.

13. The apparatus of claim 1, wherein the memory further comprises a reference table containing spectral responses of a plurality of reference samples and color characteristics associated with the reference samples.

14. The apparatus of claim 13 wherein the processor is configured to provide color characteristics of the sample, based at least in part on the spectral responses of the sample and the reference table according to a predetermined scheme.

15. The apparatus of claim 1 wherein the memory further comprises at least one standard data table for color coordinates determination.

16. The apparatus of claim 15 wherein the processor is further configured to provide standard color coordinates of the sample.

17. A method, comprising:
    configuring at least one radiation source to provide N (N≧2) independent illuminant sources characterized by M (M≧2) wavelength channels in a predetermined wavelength range;
    providing a sensor unit including at least one optical sensor, the sensor unit configured to be in optical communication with the radiation sources and a sample;
    storing in a memory an illuminant characterization matrix having spectral characteristics of the N illuminant sources in the M wavelength channels; and
    providing a processor in communication with the sensor unit and the memory, the processor configured to provide spectral responses of the sample in the M wavelength channels, based at least in part on the illuminant characterization matrix.

18. The method of claim 17 further comprising storing in the memory calibration data associated with a substantially white sample in the predetermined wavelength range, the processor configured to provide spectral responses of the sample in the M wavelength channels based at least in part on the illuminant characterization matrix and the calibration data.

19. The method of claim 17 further comprising providing a display panel in communication with the processor.

20. The method of claim 17 further comprising providing at least one user-interface element.

* * * * *